July 25, 1944.　　LE ROY N. HERMANN　　2,354,315
CAMERA EXPOSURE CONTROL
Filed Oct. 11, 1941　　2 Sheets-Sheet 1

Inventor:
Le Roy N. Hermann
By [signature] Atty.

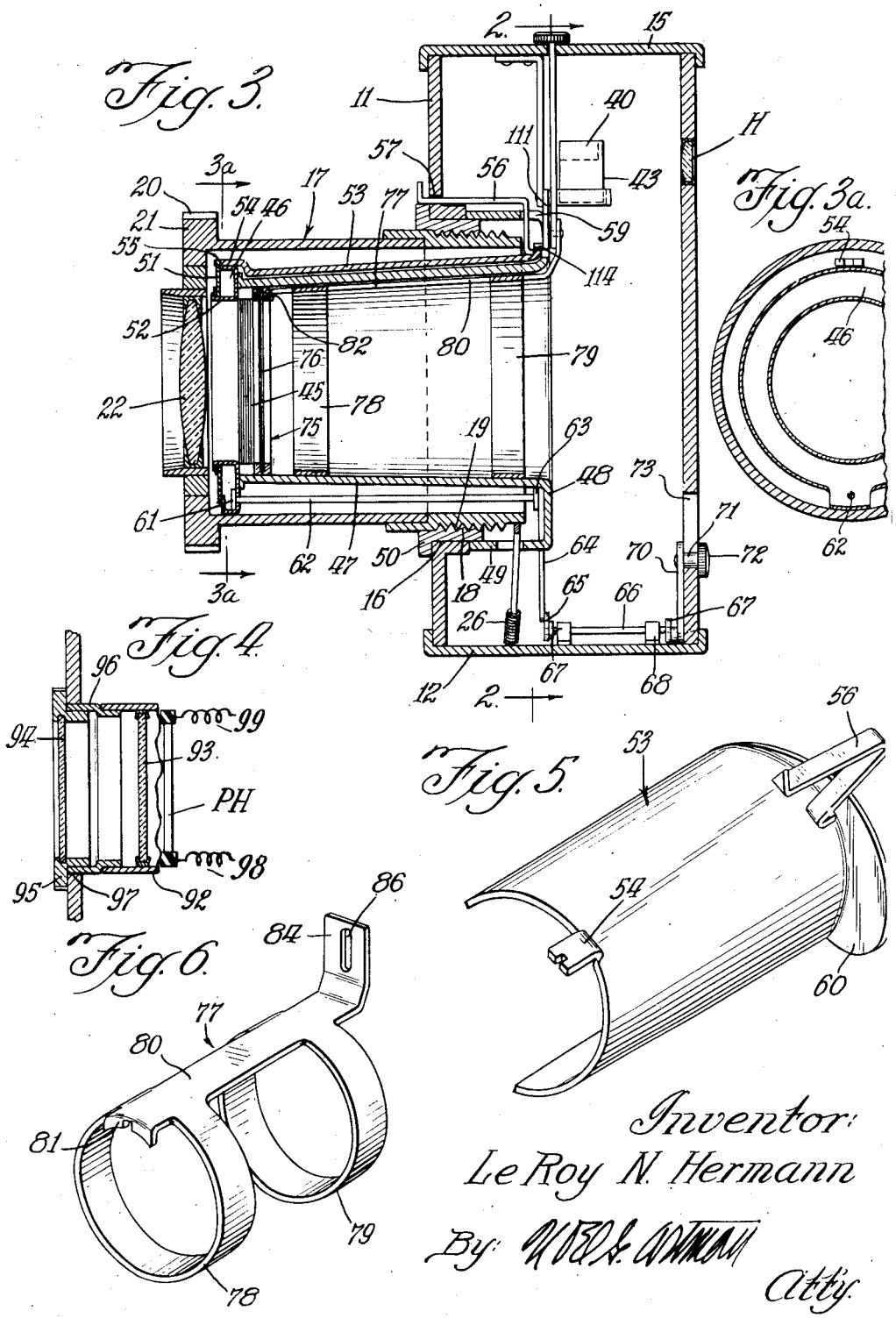

Patented July 25, 1944

2,354,315

UNITED STATES PATENT OFFICE 2,354,315

CAMERA EXPOSURE CONTROL

Le Roy N. Hermann, Chicago, Ill.

Application October 11, 1941, Serial No. 414,632

3 Claims. (Cl. 95—10)

This invention has to do with an exposure control for photographic cameras. More particularly it relates to a novel, practical, convenient and effective control by means of which the iris can be quickly adjusted for proper light admission through the objective, the adjustment being predicated upon both shutter speed and the amount of light issuing from the photographic subject.

The invention contemplates complemental indicator parts respectively actuatable according to shutter speed adjustment and according to the energy of a photo-sensitive device which is subjected to the light issuing from a photographic subject to a degree controlled by means for regulating the amount of light passed by the shutter during an exposure period.

There is the further contemplation of a camera embodying the above features and wherein the indicator parts are viewable from the same position as focusing apparatus wherefore the adjustment for light can be quickly made while maintaining the camera directed toward the subject preparatory to making an exposure.

Additional desirable objects inherent in and encompassed by the invention will become apparent from the ensuing description, the appended claims and the annexed drawings, wherein:

Fig. 3 is a transverse sectional view taken through the camera substantially on the line 3—3 of Fig. 2 and illustrating the lens barrel and parts contained therein;

Fig. 3a is a sectional view taken on the line 3a—3a of Fig. 3;

Fig. 4 is a fragmentary sectional view taken through a polarized mask or shield embodied in the camera and substantially upon the line 4—4 of Fig. 2;

Fig. 5 is a perspective view of a shutter speed control member;

Fig. 6 is a perspective view of an iris control member;

Figure 1:
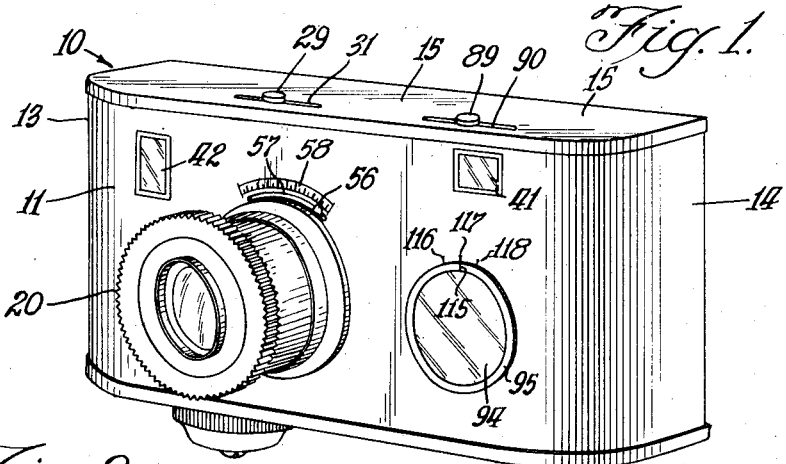
Fig. 1 is a side elevation view taken in perspective of a camera constructed according to the principles of the present invention.

A camera embodying my invention comprises a casing 10 having a front wall 11, a bottom wall 12, end walls 13 and 14 and a top wall 15.

The front wall of said casing is provided with a circular opening 16 for receiving an end of a lens barrel 17. A flanged sleeve 50 internally threaded at 18 is press-fitted or otherwise firmly secured within the opening 16 and the threads upon this sleeve meshed with external threads 19 upon the base section of the lens barrel. Such threads 18 and 19 cause axial movement of the lens barrel when it is manually rotated as by grasping and turning a milled peripheral edge 20 upon a flange 21 at the outer end of the barrel, or by additional means presently to be described. An objective lens 22 constituting a part of the lens system of the camera is carried in the outer end of the lens barrel and is moved axially therewith in the customary manner to enable the camera to bring a photographic subject into focus.

Figure 2:
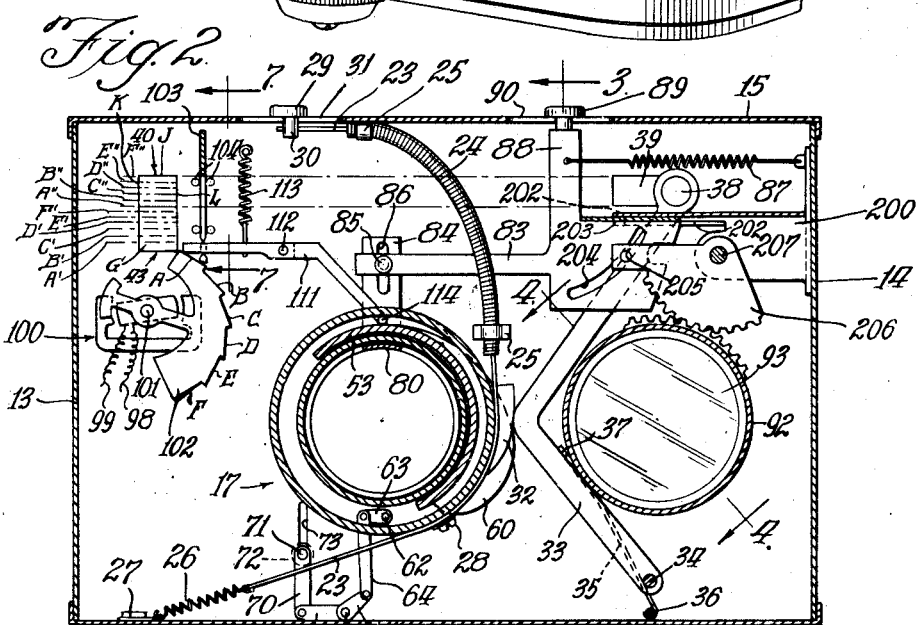
Fig. 2 is a vertical sectional view taken through the camera substantially as indicated by the line 2—2 in Fig. 3, there being parts omitted for clarity.

The aforesaid additional means for rotating the lens barrel and thus causing its axial displacement is illustrated in Figs. 2 and 3 where it will be seen to comprise a flexible wire 23 slidably disposed within a casing 24 which is held in the curved position illustrated in Fig. 2 by a plurality of clips as 25 suitably secured to the casing. An expansible contraction spring 26 is connected between the lower end of the wire 23 and an anchorage 27 upon the casing bottom wall, and a set-screw 28 or the equivalent is employed for connecting an intermediate section of said wire to the lens barrel. A slider button 29 has a shank 30 disposed within a slot 31 in the upper wall of the casing, said shank being fixed to the upper end of the wire 23. When the button 29 is engaged as by the finger of the operator and moved to the left as viewed in Fig. 2 the wire 23 will be drawn upwardly through the casing 24 incident to distending the spring 26 and rotating the lens barrel 17 counter-clockwise. Preferably, though not necessarily, the strength of this spring 26 is sufficient to rotate said barrel clockwise when the button 29 is released, so the operator will learn to habitually focus the device each time it is directed toward a photographic subject.

The back end of the lens barrel 17 has upon a side thereof a cam lobe 32 for imparting pivotal movement to a slender L-shaped arm 33 which is pivoted at its lower end upon a pin 34. This arm 33 is engaged by a leaf spring 35 which serves to maintain said arm in engagement with the cam lobe 32, the lower end of the spring 35 being anchored to the casing 10 by a pin 36 while the upper end has an ear 37 hooked over an edge of said arm, and an intermediate section bears reactively against a section of the pivot pin 34. A lens 38 is carried in the upper end of the arm 33 and this lens cooperates with a prism 39 in projecting a light image of the photographic subject to the upper prism portion of a glass optical piece 40 in the manner well understood in the art. The lens 38 registers with and receives light through a window 41 near the upper edge of the casing front wall 11. A second window, designated 42, and spaced laterally from the window 41, as viewed in Fig. 1, permits the passage of light into the casing and through parallel front and back faces of a parallelepiped shaped lower portion 43 of the member 40. This arrangement is known in the art as a split field range finder. Incident to focusing the camera the operator will look forwardly through an eye piece H in the back wall of the casing and through the optical piece 40 where he will see an upper light-image component of the photographic subject as transmitted through the lens 38 and the prism 39, and a lower light-image component of said subject as viewed directly through the window 42 and the portion 43 of the optical piece 40. When the camera is focused upon the subject the cam lobe 32 will cause the lens 38 to be so positioned with respect to the prism 39 that the image component transmitted thereby into the optical piece 40 will align vertically and complementally with the image component viewed through the member 43 to effect a complete image.

A shutter mechanism for the camera includes a conventional set of shutter blades 45 actuated by parts (not shown) of any standard type enclosed within an annular chamber 46 which is supported upon the front end of a tube 47. The back end of the tube has an annular radially extending portion 48 having about its edge a forwardly extending flange 49 press-fitted onto the back end of the internally threaded ring 50 and thus secured to the casing.

The parts within the chamber 46 may be of the structure disclosed in U. S. Patent No. 1,941,-292, issued to Hans Deckel et al. Various operation speeds for which the shutter may be set are controlled by a rotatable ring 51 which is journalled upon a forwardly projecting section of the inner cylindrical wall 52 of the shutter chamber. Rotation of the ring 51 is obtained by rotative manipulation of a semi-cylindrical member 53 which is shown in perspective in Fig. 5 and loosely mounted on the tube 47 as shown in Figs. 2 and 3. This member 53 has a bifurcated finger 54 upon its front end which straddles a stud 55 which projects radially outwardly from the ring 51 as illustrated in Fig. 3. A pointer 56 by means of which the member 53 can be rotated is connected to a back end portion of said member 53. The forward end of this pointer projects outwardly of the casing through an arcuate slot 57 above which there is a scale plate 58, Fig. 1, along which the pointer may be adjusted for indicating the speed at which the shutter is set. In Fig. 3 the base portion of the tube 47 will be seen to have an opening 59 which also receives and permits adjustment of the pointer 56.

There is a cam lobe 60 upon the back end of the sleeve member 53 for actuating a part of light admission control mechanism constituting a part of the present invention and presently described in detail.

The shutter mechanism is of the character adapted to be cocked and thereafter tripped for actuating the shutter blades 45 in a single unidirectional movement of a control lever. Such cocking and tripping lever is indicated at 61 in Fig. 3, this lever being controlled by a linkage and shafting comprising a shaft 62 journalled at opposite ends in the back wall of the shutter chamber 46 and in the radial wall 48 of the tube 47. This shaft 62, as will be seen in Figs. 2 and 3, is rotatable by means of an arm 63 non-rotatively fixed thereto, a vertical link 64 pivotally connected to the outer end of the arm 63, an arm 65 having one end connected to the lower end of the link 64 and its opposite end fixed non-rotatively to a shaft 66 (said shaft being journalled in bearing brackets 67 and 68), an arm 69 non-rotatively fixed to the back end of the shaft 66, and a link 70 having mounted in the upper end thereof a shank 71 of a finger actuatable button 72. Said shank 71 is slidable in a vertical slot 73 in the lower right-hand section of the casing back wall. Spring means (not shown) in the shutter chamber 46 normally holds the lever 61 and the shaft 62 at a clockwise limit of oscillative movement as viewed from the front and thus through the above described linkage normally holds the finger actuatable button 72 at the lower end of the slot 73. While so adjusted the mechanism is prepared for actuation by the button 72 to effect an exposure. This is accomplished by sliding the button 72 upwardly in its slot, thereby causing clockwise rotation of the shaft 66 as viewed from the front whereby the arm 65 is rotated for drawing the link 64 and the outer end of the arm 63 downwardly for effecting counter-clockwise rotation of the shaft 62 and of the cocking and tripping lever 61. During this upward movement of the button 72 the lever 61 will first cock the shutter and then trip it for imparting an exposure movement to the shutter blades 45. Following exposure, the button 72 will be released and allowed to return to the starting position illustrated in Fig. 3 under the force of the aforementioned spring means in the chamber 46.

Light admissibility control means in the form of an iris mechanism 75 comprising blades 76 for controlling admittance of light into the camera during an exposure period is carried in the tube 47 adjacently to the shutter blades 45. The opening formed by and centrally of the iris 75 for regulating light admittance into the camera is controllable in size by an actuator 77 shown in perspective in Fig. 6. This actuator comprises a pair of ring-like bearings 78 and 79 rotatable about and upon the interior of the tube 47. Said rings 78 and 79 are connected by a strap 80, and a bifurcated extension 81 at the forward end of the strap receives an actuator pin 82 extending backwardly from the iris. Displacement of the pin 82 circumferentially of the iris causes the central opening defined by the blades 76 to be adjusted in diameter in the manner well understood in the art.

Rotation of the actuator 77 and hence adjustive displacement of the pin 82 is accomplished by endwise adjustment of a bar 83 which has its left end, Fig. 2, connected with an upward extension 84 by means of a pin 85 slidable vertically within a slot 86 within said extension. The bar 83 is reciprocally mounted in a bracket 200 upon the casing end wall 14, there being oppositely directed lateral flanges 202 (one being shown in Fig. 2) along its upper edge slidably carried upon opposed inwardly directed flanges 203 (one being shown in Fig. 2) of the bracket. Said bar is urged to the right by a spring 87 having one end connected with the bracket 200 and its opposite end connected with an upward projection 88 of the bar. A finger actuatable button 89 is mounted upon the upper end of the extension 88 and is slidable lengthwise within a slot 90 in the casing upper wall 15. Excepting when the finger button 89 is held in some position to the left as viewed in Fig. 2 against the force of the spring 87, said button will be caused to occupy a position at the right end of the slot 90 and thereby rotate the actuator 77 for holding the iris or light admissibility control means at its limit for excluding a maximum amount of light.

Coordination means for controlling the relative settings of the shutter and iris will now be described. One part of such coordination means is regulated by the bar 83 and includes a cam slot 204 in said bar that receives and displaces a pin 205 for rotating a segment gear 206 journalled at 207 on the bracket 200. Rotation of the segment 206 causes rotation of a toothed ring 92 which serves as a mount for a light polarization disk 93 for operating complementarily with a second light polarization disk 94, the latter being mounted within a ring 95 which is manually adjustable rotatively within a second ring 96 fixed within an opening 97 in the casing front wall 11. When the polarized disk 93 is rotated to its clockwise limit, Fig. 2, by the action of the spring 87 in returning the button 89 to the right end of the slot 90, the plane of polarization of said disk 93 will be at right angles to the plane of polarization of the disk 94 whereby these disks will coact for excluding light from the casing through the opening 97.

A light sensitive cell shown diagrammatically at PH is disposed behind the polarized disk 93. Normally this cell will be protected from light by the disks 93 and 94 since the spring 87 will retain the disk 93 in the light exclusion position excepting when the camera is being adjusted preparatory to an exposure. Electric energy from the photo-sensitive cell is carried by a circuit, including conductors 98 and 99, to a diagrammatically represented electrical instrument 100 which includes a shaft 101 rotatable counter-clockwise from the rest position shown in Fig. 2 in an amount constituting a function of the amount of current carried to the instrument through the conductors 98 and 99. An indicator plate 102, corresponding to the needle of any electric instrument, is fixed on the shaft 101. This plate 102 has a series of steps respectively designated A, B, C, D, E and F and occupying positions graduated in radial distance from the shaft 101 increasing in the order named. Amounts of electric energy can be introduced into the instrument 100 for causing the plate 102 to rotate counter-clockwise far enough for bringing any one of the steps as A into registry with the flat rectangular front face G of the optical piece 40. When the steps A to F register with the face G they will occupy positions respectively indicated by the horizontal lines A' to F' and said indicator plate will mask or block out all light to the face G below any one of the registered steps.

Another part of the coordination means for controlling the setting of the shutter and iris is operated from the shutter speed control by the cam lobe 60, and includes a vertically adjustable mask or indicator member 103 for operation co-operatively with the indicator member 102. The member 103 is maintained in a vertical plane by guide pins 104 mounted within a bracket or other suitable means (not shown) supported upon one of the casing walls. These pins 104 engage downwardly extending leg portions 105 and 106 of the member 103 which are plainly shown in Fig. 7, and, while holding the member 103 in a vertical plane, permit vertical movement thereof. The lower outer edges of the legs 105 and 106 are notched at 107 and 108 for receiving the legs 109 and 110 of a lever 111 mounted upon a fixed pivot 112. The right and downwardly extending end of the lever 111, Fig. 2, engages the periphery of the cam 60 upon the rotatable member 53 which controls the speed at which the shutter is set to operate. A spring 113 having its upper end connected with the casing 10 and its lower end hooked under and about the lever 111 maintains this lever pivoted to press its lower end 114 against the periphery of the cam lobe 60 at all times. Therefore, when the control member 53 is rotated by means of the finger tab and pointer 56 which is accessible exteriorly of the casing 10 as seen in Fig. 1, for changing the speed at which the shutter mechanism is set, the cam lobe 60 will cause the lever 111 to pivot and thereby change the elevation of the indicator member 103.

The drawings illustrate the pointer 56, the member 53 and the cam lobe 60 occupying the position corresponding to that in which the shutter mechanism is set for operation at maximum speed. As the pointer 56 is moved counterclockwise in the slot 57, Fig. 1, the member 53 and the cam lobe 60 thereon, Fig. 2, will be moved counter-clockwise, whereby the lever 111 will be pivoted counter-clockwise against the urge of the spring 112 wherefore the legs 109 and 110 of the lever will slide the indicator member 103 downwardly between the guide pins 104.

When the shutter is adjusted for taking a picture at its fastest speed the indicator member 103 will be in its uppermost position whereby one looking through the range finder eyepiece H will be able to view the entire image through the optical piece 40. For one to obtain enough light in the camera through the objective for the proper exposure of the film at this short interval, the iris 75 will need to be opened comparatively widely, and in order to ascertain when the iris is open the proper amount the parts of the coordination means under control of the iris setting means, that is, the cam slot 204, the polarized disks 93 and 94, the electrical circuit including the aforesaid photo-sensitive cell and the instrument 100, will be so calibrated that when the iris is opened sufficiently wide the disks 93 and 94 will admit enough light to the photo-sensitive cell for causing the instrument 100 to rotate the indicator plate 102 counter-clockwise into position for carrying the step F in registry with the optical piece 40. This step will then blank out that part of the optical piece below the horizontal line F'. Now it will be observed that the portion of the optical piece, as viewed in Fig. 2, bounded by the line F', the upper face J of said piece and by the vertical sides K and L will form an illuminated square as seen through the eyepiece H. Should the operator find that he has moved the iris setting button 89 to its leftmost limit as viewed in Fig. 2 for opening the iris to the maximum of its adjustment, but is still unable to obtain enough energy from the photo-cell for shifting the step F into registry with the optical piece 40 to effect the aforesaid square, then he will know the subject is not lighted well enough for taking the picture at the speed for which the shutter is set.

If the subject is artificially lighted its illumination may be increased sufficiently for obtaining enough light formed for taking the picture and this can be ascertained by again opening the iris until the step F on the indicator 102 reaches registry with the optical piece to form the light square, assuming the illumination of the subject to be increased sufficiently.

Another way of meeting the situation is to decrease the speed at which the exposure is to be made, assuming the subject to be one involving no movement making it impractical to photograph it at the slower speed. For instance, should the operator set the shutter to operate at a speed corresponding to the positioning of the lower edge of the indicator member 103 in horizontal alignment with the line C'', the iris setting will then be made at which the polarized disks 93 and 94 pass enough light for causing the photo-cell to energize the instrument 100 for bringing the step C into registry with the optical piece 40. Such adjustment of the iris can be ascertained by the operator since he will then observe the perfect light square bounded on its upper and lower sides by the lines C'' and C'. When the shutter is set for the slow speed at which the lower edge of the indicator member 103 is aligned with the horizontal line A'' the iris will be regulated in its opening until the step A of the indicator 102 is brought to registry with the optical piece at the horizontal line A', and so on.

When the higher speed exposures are to be made the operator will be able to perform the entire operation, subsequent to setting the shutter for the desired speed, while holding the eyepiece H in sighting position to his eye. After the shutter has been set to the desired higher speed, the operator will grasp opposite ends of the casing 10 in his two hands incident to placing the end of his left index finger upon the iris adjusting button 89, the end of his right index finger upon the focusing button 29 and the end of his right thumb upon the shutter cocking and trip button 72. Thereupon the button 29 will be shifted to bring the subject into focus, the button 89 will be shifted until the indicator member 102 brings the proper step as E into registry with the optical piece 40 for forming the lighted square, and then the right thumb will shift the cocking and trip button 72 upwardly for effecting the exposure.

If the indicator member 103 is made of opaque material, the procedure in taking pictures at the lower speeds will incur the focusing step before the speed adjustment step since the adjustment for the lower speeds lowers the member 103 into positions where it would blank out a substantial portion of the split field component transmitted through and from the prism 39. However, the speed adjustment can be made without lowering the camera from the sighting position for, following the focusing step, the operator can ascertain the speed setting according to whether the lower edge of the indicator member 103 appears at the positions A'', B'', C'', etc. After the desired speed is obtained by manipulating the pointer 56 incident to observing its effect through the eyepiece H, the adjustment for the iris will be made as above described prior to actuating the shutter cocking and trip button 72.

When the indicator member 103 is made of a translucent material such as lightly stained or colored glass which will not blank out the upper image component, the speed and focusing steps may be performed in either order.

Although the spring 87 is incorporated into the device as an expedient for maintaining the polarized disks 93 and 94 in light excluding relation excepting when the camera is being sighted preparatory to the taking of a picture, the photosensitive cell will deteriorate in effectiveness with age and use. When the cell becomes less sensitive to light it will be necessary to compensate for this condition so the calibrated relation of light admittance through the iris and angular displacement of the indicator member 102 will be preserved. When a fresh photo-cell is in the device, the ring 95 will be rotated to bring the index mark 115 thereon into registry with the scale mark 116 on the casing front wall and will be left in this position for when so positioned the polarization planes of the disks 93 and 94 will be at right angles when the spring 87 returns the button 89 to the right end of its slot 90 and all light will be excluded from the cell. However, as the cell becomes less sensitive to light, before a series of pictures are to be taken the operator will rotate the ring 95 and hence the disk 94 for bringing the index mark 115 into alignment with the scale mark 117. This rotation of the disk 94 is equivalent to advancing the disk 93 so that more light will be admitted through the disks 93 and 94 onto the cell per unit advance of the disk 93 pursuant to setting the iris. After the picture series has been taken the ring 95 will be reset with the mark 115 opposite the scale mark 116 so absolute exclusion of light will be obtained. When the cell becomes still more depleted the ring 95 will be rotated farther to bring the mark 115 into registry with the scale mark 118 before the taking of a picture or pictures, to incur a further increment in the light admitted to the photo-cell per unit advance of the disk 93 pursuant to iris adjustment, to compensate for the still less effective cell. Again, after the picture or series of pictures have been taken the ring will be rotated to bring the mark 115 to the light excluding position with the mark 115 set opposite the scale mark 116.

Figures 7, 8:
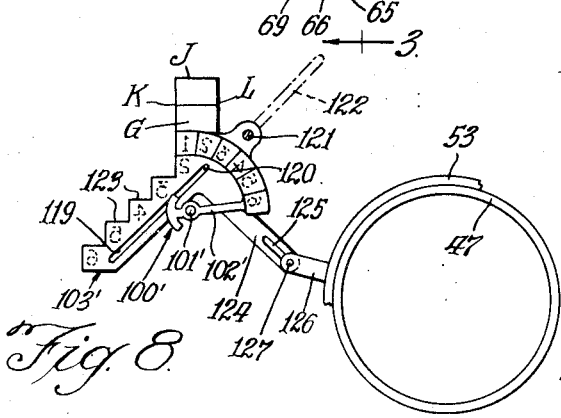
Fig. 7 is a side elevational view of one of complemental parts of coordination means for the settings of the shutter and the iris.
Fig. 8 is a partially diagrammatic view illustrating a modified form of indicator parts of coordination means for the settings of the shutter and of the iris.

In Fig. 8 there is shown a modified form of indicator members respectively operable pursuant to the setting of shutter for different speeds and to the setting of the iris for different light admittance capacity. Here the indicator member 102' corresponds to the indicator member 102 and is mounted upon the shaft 101' of an instrument 100' corresponding to the above described instrument and which instrument is energized by an electrical circuit as above described. The indicator member 102' differs from the member 102 primarily in that the circumferential sections thereof bear respective numbers "1" to "6" instead of the steps A to F. In place of the indicator member 103 above described this modified form of the invention employs a reciprocal indicator member 103' having a slot 119 in which there is a supporting pin 120 supported from a casing wall. The indicator member 103' also carries a pin 121 which rides in a diagrammatically illustrated slot 122 within a bracket (not shown) suitably mounted upon one of the casing walls. Thus the slots 120 and 121 guide the indicator member 103' for diagonal movement. There are a series of steps 123 upon the indicator member 103' and which respectively bear upon their reverse sides the numbers "1" to "6" of which the numbers "2" to "6" are indicated in dotted lines, the digit 1 being concealed behind the indicator member 102'. The indicator member 103' also includes an arm 124 in which there is a slot 125 facilitating the connection of this arm to an arm 126 upon the shutter setting member 53 by means of a pin 127.

During an adjustment of the shutter for selecting an operating speed thereof the member 53 is rotated and through the connecting arms 126 and 124 will cause linear movement of the indicator member 103' to station different of the numbers "1" to "6" in a position where they can be observed through the eyepiece H in the lower right-hand portion of the face G, Fig. 8. Thus the shutter can be set to the desired speed while the camera is held in the sighting position, the lowest speed being indicated by the numeral "1" and the highest speed by the numeral "6." The proper iris adjustment prevails when the instrument 100' responds to the photo-cell excitation for rotating the indicator member 102' into the position for exposing the same number in registry with the lower left-hand portion of the optical piece face G as is exposed by the member 103' in the lower right-hand portion of such face.

Such terms as "light" and "light-sensitive" as used in this specification and the appended claims are intended to include invisible photo-rays such as infra-red as well as those rays in the video range.

While I have herein shown and described particular apparatus illustrating the invention it should be understood that this invention comprehends other structures, modifications, changes in design and rearrangement of parts falling within the spirit thereof.

I claim:

1. In a camera, a shutter settable to effect exposure periods of different duration, shutter setting means, an iris settable to control the amount of light admitted to the camera during an exposure period, iris setting means, an indicator member having a series of indicia thereon, said member being interlocked with said shutter and disposed within a field in which it is viewable and for movement transversely of such field in accordance with the setting of said shutter, light responsive means, an additional indicator member also having a series of indicia thereon, said additional member being under control of said light responsive means and also disposed in such field and for movement transversely thereof in accordance with the amount of light to which said light responsive means is subjected, and shield means interlocked with said iris and operable to expose said light responsive means in different degrees according to the setting of said iris, and said indicator members being complementally coordinated whereby the correct setting of the iris for any shutter setting is incurred when predetermined of the indicia respectively on said indicator members occupy predetermined relative positions.

2. In a camera wherein there is a light passage for the exposure of a photographic subject, a shutter settable to effect exposures of different duration, an iris settable to control the amount of light admitted through the passage during an exposure period and a sighting means viewable from a zone to facilitate alignment of the passage with the subject; the combination of shutter setting means, iris setting means, indicator means operable to expose different indicia thereof of a series in a field wherein they are viewable from said zone and under control of the shutter setting means in accordance with the setting of the shutter, light responsive means, additional indicator means also operable to expose different indicia thereof of a series in said field but under control of said light responsive means and in accordance with the amount of light to which said light responsive means is subjected, and shield means operable under control of the iris setting means and operable to expose said light responsive means in different degrees according to the setting of the iris, and said indicator means being complementally coordinated whereby the correct setting of the iris for any shutter setting is incurred when predetermined of the indicia respectively on said indicator members occupy predetermined relative positions.

3. In a camera wherein there is a light passage for the exposure of a photographic subject, a shutter settable to effect exposures of different duration, an iris settable to control the amount of light admitted through the passage through an exposure period and a sighting means including a focusing window; the combination of shutter setting means, iris setting means, indicator means operable to expose different indicia thereof of a series in a field wherein they are viewable through said focusing window and under control of the shutter setting means in accordance with the setting of said shutter, light responsive means, additional indicator means also operable to expose different indicia thereof of a series in said field but under control of said light responsive means and in accordance with the amount of light to which said light responsive means is subjected, and shield means under control of the iris setting means and operable to expose said light responsive means in different degrees according to the setting of the iris, and said indicator means being complementally coordinated whereby the correct setting of the iris for any shutter setting is incurred when predetermined of the indicia respectively on said indicator means are in predetermined relation.

LE ROY N. HERMANN.